Jan. 24, 1933.  A. J. LEWIS  1,895,079
WORK SPINDLE DRIVE FOR CHUCKING MACHINES
Filed Jan. 31, 1931    2 Sheets-Sheet 1
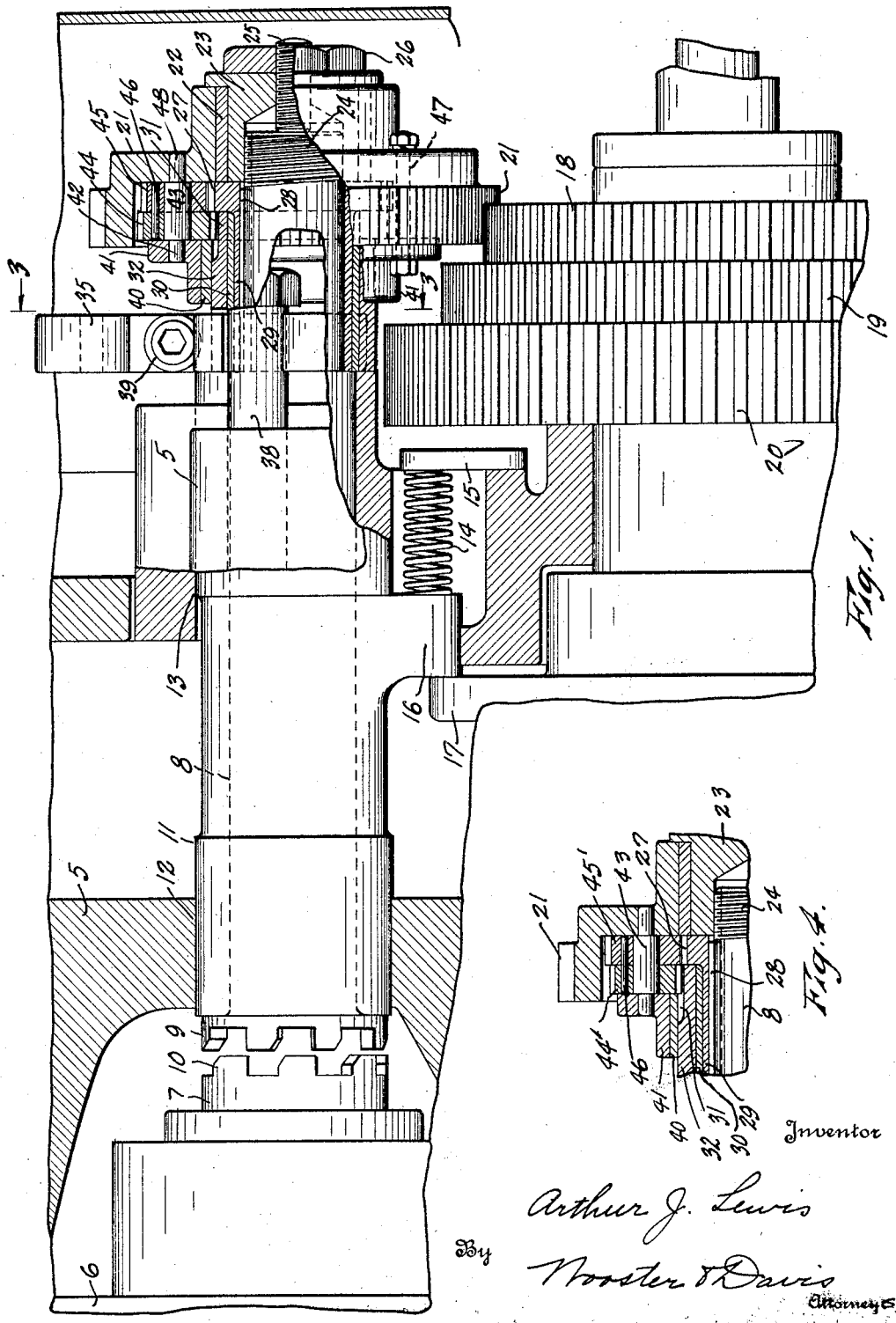
Inventor
Arthur J. Lewis
By
Wooster & Davis
Attorneys Jan. 24, 1933. A. J. LEWIS 1,895,079
WORK SPINDLE DRIVE FOR CHUCKING MACHINES
Filed Jan. 31, 1931 2 Sheets-Sheet 2
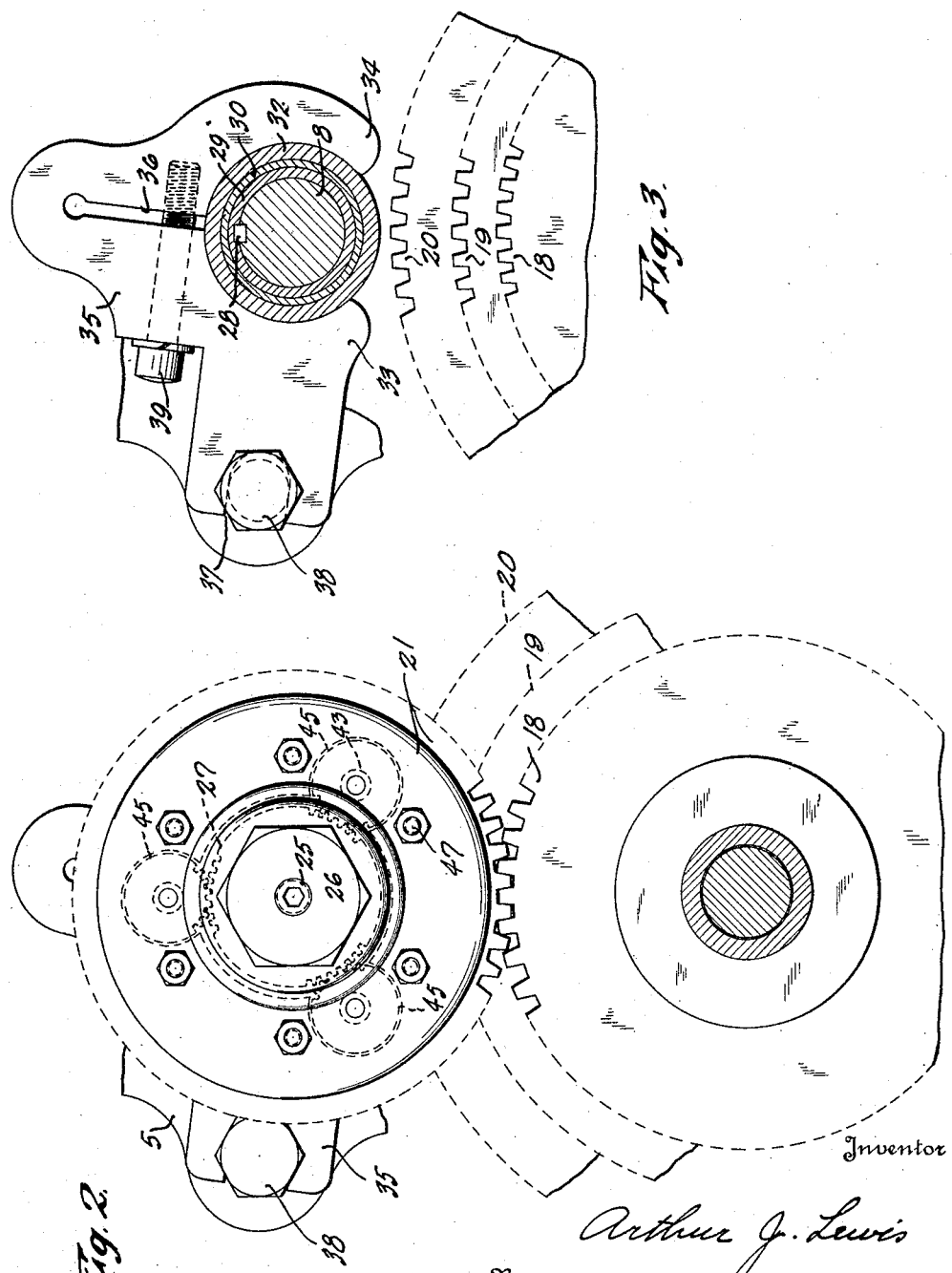

Patented Jan. 24, 1933

1,895,079

UNITED STATES PATENT OFFICE

ARTHUR J. LEWIS, OF STRATFORD, CONNECTICUT, ASSIGNOR TO THE BAIRD MACHINE COMPANY, OF BRIDGEPORT, CONNECTICUT, A CORPORATION OF CONNECTICUT

WORK SPINDLE DRIVE FOR CHUCKING MACHINES

Application filed January 31, 1931. Serial No. 512,532.

This invention relates to a chucking machine of the type disclosed in my prior application Serial No. 362,974 for chucking machine filed May 14, 1929, in which there is a rotatable turret carrying a plurality of work spindles carrying means as chucks for holding the work to be operated upon and providing one or more work stations, and one or more loading stations at which finished work may be removed from the chucks and unfinished work mounted therein for the machining operations. A driving shaft is provided at each work station to drive the work carrying spindle at that station to rotate the work with respect to a tool or tools for the particular operation to be performed. These drive shafts have a releasable clutch drive connection to their respective work spindles which can be disconnected to permit indexing of the turret to shift the work spindles successively to the loading station or stations and the respective working stations. The means for shifting the drive shafts to first release the clutch drives to the work carrying spindles and then indexing the turret may be of the automatic type disclosed in the application above mentioned, and is not shown specifically herein.

It is an object of the present invention to provide an improved drive which may be used for the drive shaft at one or more of the work stations to provide a great reduction in speed from what is ordinarily used for these spindles, for special work without reducing the speed of operation of the remaining spindles.

Thus for example if the normal speed of the shaft is say two hundred R. P. M. this device can reduce it to say four R. P. M. for special operations such as cutting an oil groove or tapping, while the remaining spindles operate at their regular and normal speeds.

Another object is to provide a device by which the direction of rotation of the spindle may be reversed so that at one or more stations as desired the work may be rotated in opposite direction from that at the other stations for special operations such for example as cutting a left hand thread.

With the foregoing and other objects in view the invention comprises certain novel features of construction, combinations and arrangement of elements as will be more fully disclosed in connection with the accompanying drawings forming a part of this specification.

In these drawings

Figure 1 is a partial side elevation and a partial longitudinal section through the device showing its relation to the spindle drive shaft and the main shaft drive.

Figure 2 is a view looking from the right of Figure 1.

Figure 3 is a section substantially on line 3—3 of Figure 1, and

Figure 4 is a detail section through a portion of the drive showing a somewhat modified arrangement.

The machine comprises the usual frame or housing 5 in which is mounted the turret 6 for rotatable indexing movement to carry the work carrying spindles one of which is shown at 7 to the various stations. Any number of these spindles may be mounted in the turret but ordinarily six are used. Each spindle 7 at the working stations is driven by a spindle drive shaft 8 mounted for longitudinal movement in the housing or frame 5 to bring the drive clutch 9 driven thereby to and from the clutch 10 carried by the work spindle for the driving operation or to release the spindle for the indexing operation.

In the present instance the shaft 8 is mounted in a bearing member 11 mounted for sliding movement in the frame longitudinally of the axis of the shaft, such as bearings 12 and 13. A spring 14 reacting at opposite ends against a stationary abutment 15 and a lug 16 on the slidable member 11 tends to shift it toward the turret to bring the clutch members 9 and 10 into engagement. The sleeve and shaft are moved in the opposite direction by the flange 17 engaging the lug 16 and it is operated automatically to release the clutches just prior to indexing of the turret as described in my application above mentioned.

As disclosed in said prior application the shaft 8 is ordinarily driven by a gear secured thereto and meshing with one of a number of drive gears 18, 19, 20 driven from the main drive. It is to be understood that all the spindles at the various work stations will be driven in a similar manner from these gears except the shaft or shafts for special work or operations using the improved drive which is the subject of this application. The other shafts and the drives therefor are not shown in the drawings to simplify them and to avoid confusion.

The improved drive for special work or operation comprises a driven gear 21 meshing with one of the gears 18, 19, or 20 in the present instance gear 18, and rotates on a bushing 22 on a bearing 23 secured on the shaft 8. The member 23 is secured to the shaft by any suitable means such as being threaded on the shaft as shown at 24 and locked in position by a clamping stud 25 threaded in the member 23 and adapted to clamp against the end of the shaft and be locked in position by a lock unit 26.

A second driven gear 27 is secured to the shaft 8 to drive this shaft by any suitable means such as a key 28 and has a hub or sleeve portion 29 embracing the shaft to secure the necessary length of engagement therewith. About this sleeve portion is a bearing sleeve or bushing 30 and within a stationary gear 31. This gear has a sleeve portion 32 embracing the sleeve 30 and extending within the jaws 33 and 34 of a clamp 35. This clamp is split at 36 so that the jaws may have sufficient relative movement to clamp and release the sleeve portion 32. The clamp has a notch or recess 37 in one side embracing a stationary stud 38 secured to the frame or housing 5. By this arrangement the clamp is held against rotation but may move longitudinally of the stud 38 to permit it to move with the shaft 8 when it is shifted by the means 17. The jaws 33 and 34 may be clamped or released by the clamping screw 39. It will be evident when the jaws are clamped about the sleeve portion 32 the gear 31 will be held against rotation but may move longitudinally with the shaft 8.

A bushing 40 about sleeve 32 carries a rotatable collar 41, the collar being rotatable relative to the gear 31 and carries one end 42 of bearing pins 43 for planetary gears 44, 45 the other ends of the pins 43 being supported in the side portion of the driven gear 21 as shown at 48. Planetary gear member 44 meshes with stationary gear 31 while planetary gear member 45 meshes with driven gear 27 connected to shaft 8. Gear members 44 and 45 may be in one piece but are easier to manufacture if made separately and then connected together as by pins 46, so they are in effect one gear with portions meshing with two different gears. Gear 21 and collar 41 are connected together by bolts 47.

It will be evident that as gear 21 is rotated from gear 18 it carries with it the planetary gears 44, 45 of which there may be any number desired, in the present instance there being three shown. As the planetary gears are carried bodily around the axis of the shaft they are rotated by the portion 44 meshing with stationary gear 31, and as this portion is in effect in one piece with portion 45 this portion is also rotated and by meshing with driven gear 27 rotates the shaft 8 to which this gear is keyed. The rate of rotation of the shaft 8 will of course depend on the various gear ratios but they can be made such as to make the shaft rotate very slowly, and in either direction, depending on the special work to be performed. Thus if the normal rate of rotation of the other shafts is 200 R. P. M. for example, with this device the shaft speed may be cut down to 4 R. P. M. for example to cut an oil groove or any other operation requiring a low speed. Also by reversing the relative sizes of the gear portions 44 and 45 the direction of rotation of the shaft may be reversed. Thus in Figure 1 the portion 44 is shown of a somewhat larger diameter than portion 45 which will rotate shaft 8 in one direction, but if they are reversed so that the portion 44' (Fig. 4) in mesh with the stationary gear 31 is larger than the portion 45' in mesh with the driven gear 27 then this gear will be rotated in the opposite direction. This arrangement is shown in Fig. 4.

It will be evident from the foregoing that the device is very simple and may be applied to the spindle drive shaft at any one or more work stations of a multiple spindle indexing chucking machine without interfering with or changing the drives at the remaining stations, and does not interfere with the indexing operation between working cycles.

Having thus set forth the nature of my invention what I claim is:

1. In a machine of the character described, a frame, a spindle drive shaft mounted for longitudinal movement in the frame, a driven gear mounted to rotate on the shaft, a stationary gear having a sleeve portion, a clamp embracing said sleeve portion and having means for holding said sleeve against turning, means connecting the clamp with the frame to prevent turning movement but permitting movement with the longitudinal movement of the shaft, a driven gear connected to the shaft, and one or more planetary gears connected to the first driven gear and meshing with the stationary gear and the second driven gear.

2. In a machine of the character described, a frame, a spindle drive shaft mounted for longitudinal movement in the frame, a driven gear mounted to rotate on the shaft, a stationary gear having a sleeve portion, a clamp embracing said sleeve portion, means for clamping said clamp about the sleeve portion to hold it, a guide stud secured to the frame and having sliding connection with the clamp to hold it against rotation and permit it to shift with the longitudinal movement of the shaft, a driven gear connected with the shaft and one or more planetary gears mounted on bearings connected to the first driven gear and meshing with both the stationary gear and the second driven gear.

3. In a machine of the character described, a frame, a spindle drive shaft mounted for longitudinal movement in the frame, a driven gear mounted to rotate on the shaft, a stationary gear having a sleeve portion, a clamp embracing said sleeve portion, means for securing said clamp to the sleeve portion to hold it, a stationary guide secured to the frame to hold the clamp against rotation, while permitting movement with the longitudinal movement of the shaft, a second driven gear secured to the shaft to drive it, one or more planetary gears meshing with both the stationary gear and the second driven gear, bearing studs for the planetary gears secured at one end in the first driven gear, and a bearing collar mounted to turn on the sleeve and supporting the other ends of said studs.

4. In a machine of the character described, a frame, a rotary turret in the frame, a work spindle carried by the turret, a spindle drive shaft mounted for longitudinal movement in the frame, cooperating clutch means on the spindle and the shaft and engaged and released by said movement, a driven member mounted on the shaft, and a driving connection from said member to said shaft adapted to drive the shaft at a speed different from that of said driven member.

5. In a machine of the character described, a frame, a rotary turret in the frame, a work spindle carried by the turret, a spindle drive shaft mounted for longitudinal movement in the frame, cooperating clutch means on the spindle and the shaft and engaged and released by said movement, a driven member on the shaft, a second driven member having driving connection with the shaft and movable longitudinally therewith, and a driving connection from the first member to the second member adapted to drive the second member at a different speed from that of the first member.

6. In a machine of the character described, a frame, a rotary turret in the frame, a work spindle carried by the turret, a spindle drive shaft mounted for longitudinal movement in the frame, cooperating clutch means on the spindle and the shaft and engaged and released by said movement, a driven gear coaxial with the shaft, a second driven gear connected to the shaft, and a driving connection from the first gear to the second adapted to drive the second gear at a speed different from that of the first gear.

In testimony whereof I affix my signature.

ARTHUR J. LEWIS.